Jan. 8, 1946. S. C. LEHMAN 2,392,395
METHOD AND APPARATUS FOR PACKAGING FOOD PRODUCTS
Filed Aug. 22, 1942 4 Sheets-Sheet 2
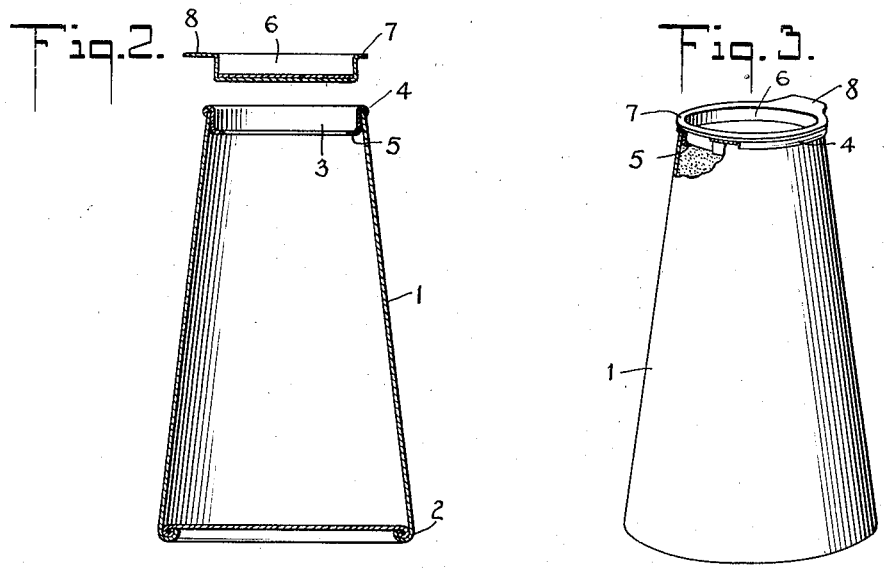
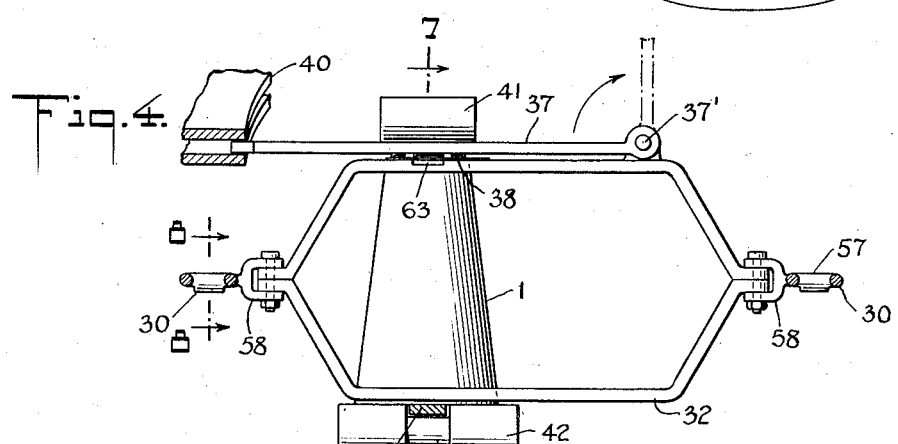
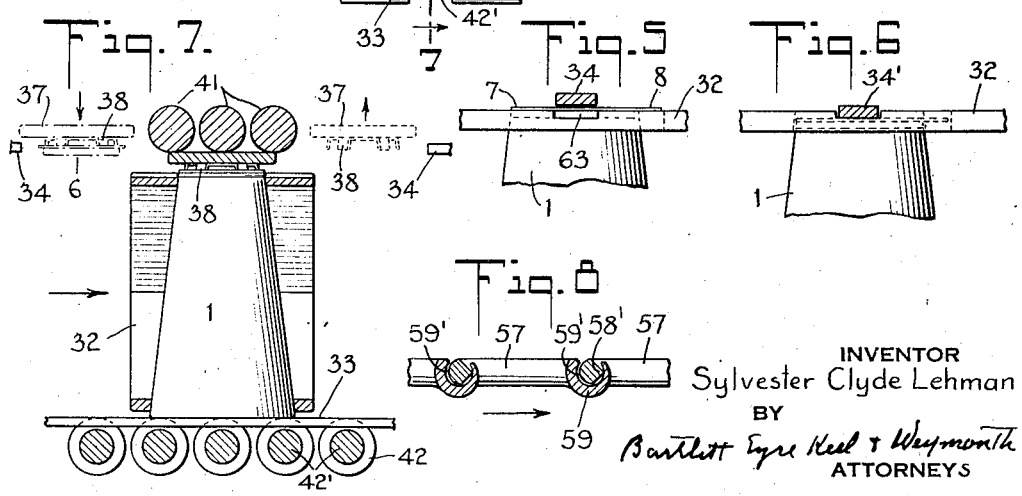
INVENTOR
Sylvester Clyde Lehman
BY
Bartlett Eyre Keel & Weymouth
ATTORNEYS

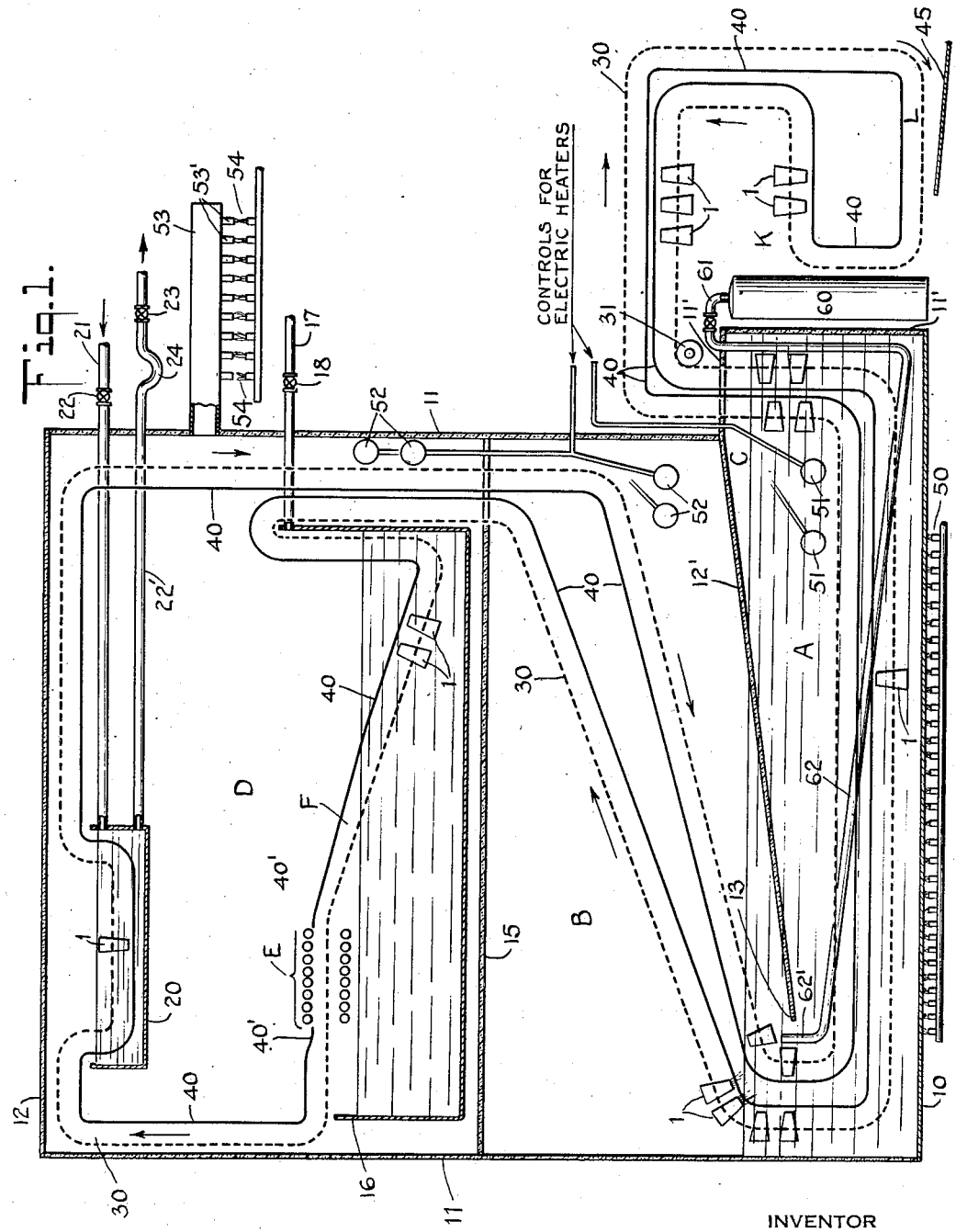

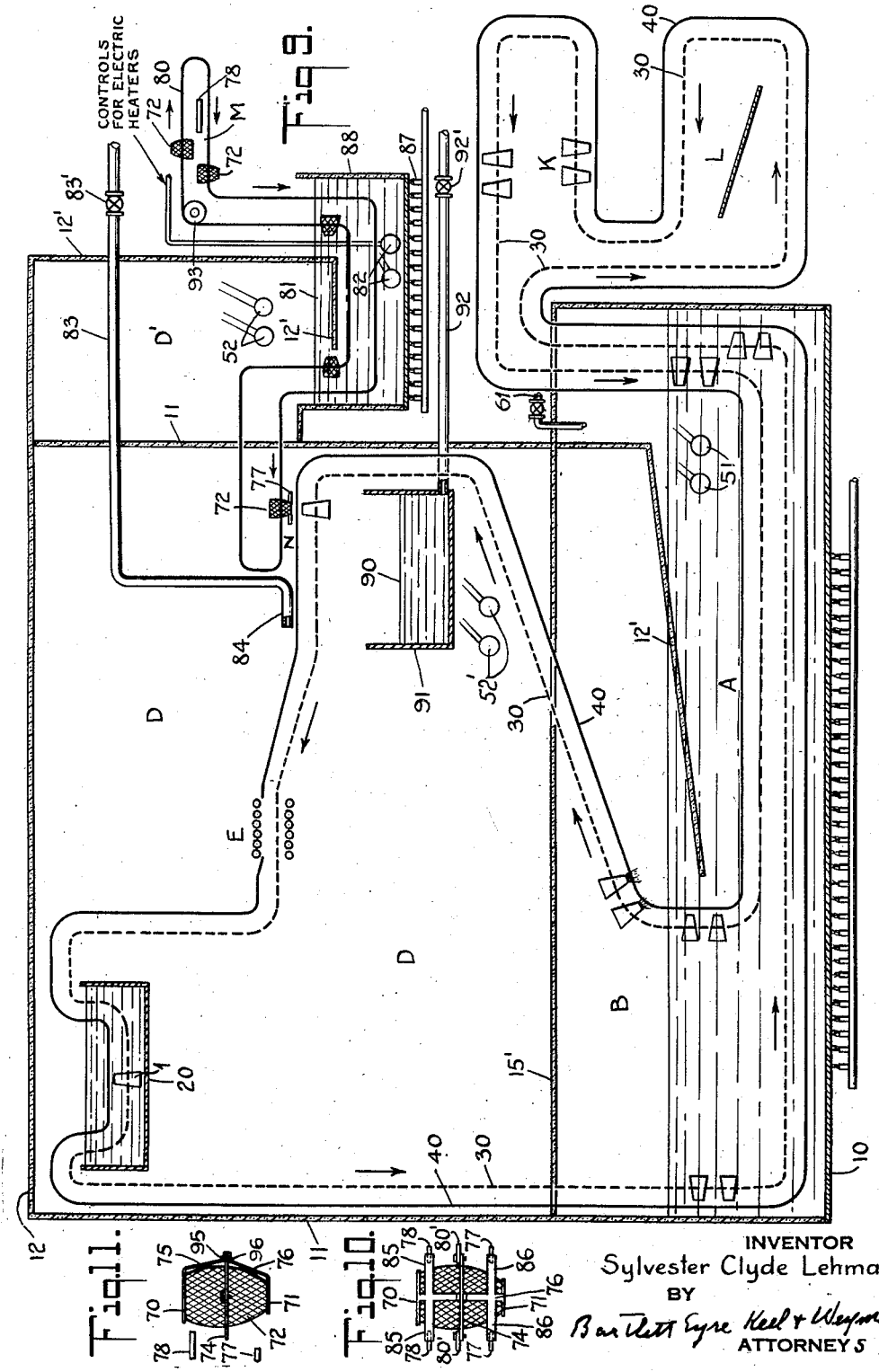

Jan. 8, 1946. S. C. LEHMAN 2,392,395
METHOD AND APPARATUS FOR PACKAGING FOOD PRODUCTS
Filed Aug. 22, 1942 4 Sheets-Sheet 4
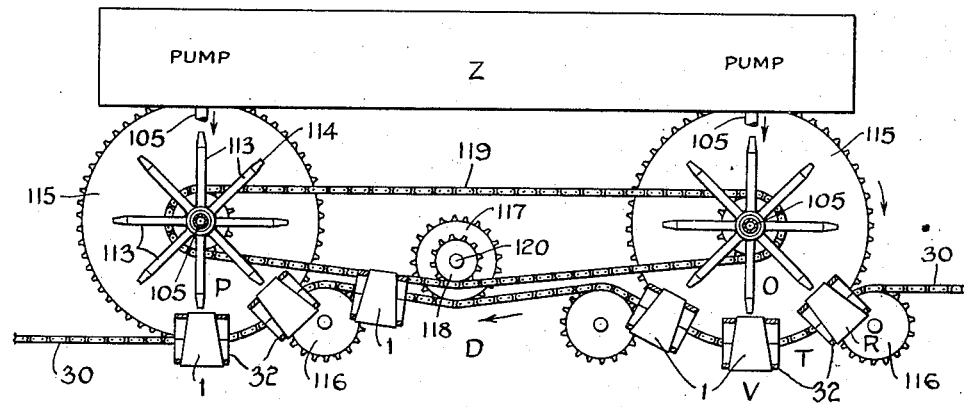
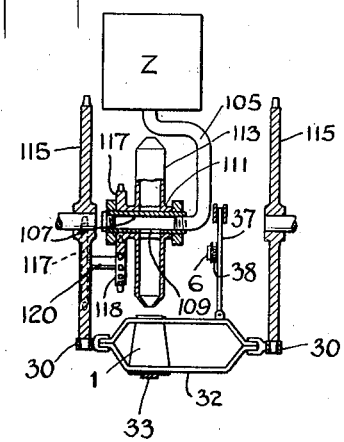
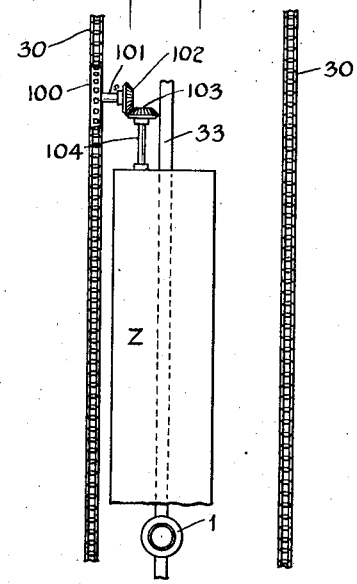
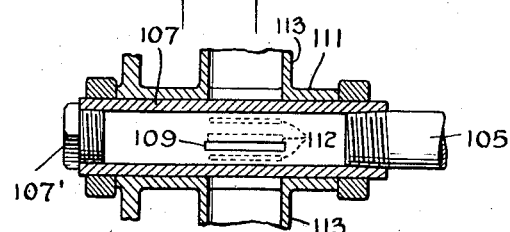
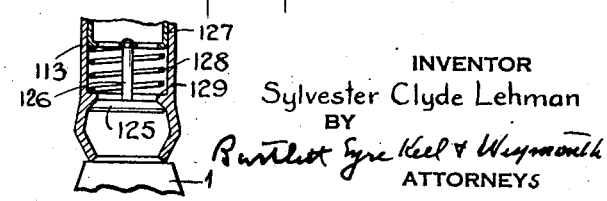
INVENTOR
Sylvester Clyde Lehman
BY
ATTORNEYS Patented Jan. 8, 1946

2,392,395

UNITED STATES PATENT OFFICE 2,392,395

METHOD AND APPARATUS FOR PACKAGING FOOD PRODUCTS

Sylvester Clyde Lehman, Jersey City, N. J.

Application August 22, 1942, Serial No. 455,764

8 Claims. (Cl. 99—182)

The present invention relates to the packaging of food products such as milk and certain features of the invention are applicable to the packaging of orange, grape or tomato juice as well as other liquiform materials and solid products.

In the packaging of mobile sterile quickly-perishable materials including especially churnable food products such as, for example, sterilized milk, to be preserved indefinitely, considerable equipment in the form of segregated units and transportation units therebetween are required, transportation of the unfinished can or container over a vast distance or territory is often necessary, considerable time and labor is required, and immense quantities of metal or material necessary, to provide what is possibly the most commercially satisfactory package so far. During war times, especially, there is apt to be a serious time, labor and metal shortage, canning and preserving units are easily bombed in some vital area portion with serious consequences, and destruction to equipment including stoppage of production as a result of air raids often experienced. Again, many of these obstacles exist in peace times. Due to the sterilizing and, as a result of rough handling, transportation problems encountered heretofore, it has been necessary in commercial practice to can and preserve many food products, especially sterilized milk, in containers which are difficult for the consumer to open, the one most used being tin-lined metal cans. It has also not been found practical to fill these cans to their entire capacity or thereabout, and when sterilized milk was used as the material charged therein, churning or fat separation of the fat globules resulted when the package was subjected to shaking of the liquid content level against the package wall, hereinafter called "package churning," especially over long distances or periods of time. In the sterilization of the can itself, it has been proposed to sterilize an open fibre can in a submerged condition in a heated bath, then convey the can so treated through an unsterilized atmosphere whereby to displace the bath liquid within the can with unsterile atmosphere, then introduce sterile air into the can by flowing air towards the can opening, and finally convey the closed can to an unsterile atmosphere where it may be shipped to the dairy plant for filling; but, it is obvious that an unsterilized space in a container can not be completely sterilized by mixing sterilized air with an unsterile atmosphere; furthermore, cans which have either unsterile exterior or interior surfaces can not be introduced into sterile atmospheres, say the sterile interiors of packaging machines for filling, without contaminating the atmosphere of that interior, except such can undergo further sterilization. Metal packaging materials have had other obstacles when used for sterilized milk, namely, they have high thermal conductivity; thus a metal package of sterilized milk after being cooled would not remain so as long as has been desired upon removal from a frigid place to room temperature; and when provided with small vent holes for filling and then sealing with solder, the method of filling was necessarily slow.

The present invention contemplates methods, apparatus, and packages produced therefrom, wherein the obstacles just mentioned have been overcome.

It is an object of the invention to provide an improved method of, and apparatus for, canning and preserving food in easily-openable cans so as to keep the contents indefinitely, and where the packaging may be performed economically and rapidly in a small area of space for the work it is to perform.

Another object of the invention is to provide a novel method of handling cans including food filling products therein comprising the steps simultaneously sterilizing and waterproofing a can at a temperature above 105° C. in bath of molten liquid in an immersed condition; simultaneously displacing the sterilizing and waterproofing liquid within the can with a presterilized atmosphere; and maintaining the can inside and outside in a sterile condition while preparing to charge, charging or filling, closing and sealing, whereby to obtain an easily-openable dispensing device leak-proofed against leakage and a package of low weight having low thermal conductivity and a rupture-proof seal capable of preserving its contents indefinitely.

Another object of the invention is to provide the last named object wherein the charging and closing operations include rapidly filling a large opening in the can with a liquiform material and closing the can with the closure wall almost, if not entirely, flush against the liquid content level, whereby filling products subject to churning will keep with less fat separation due to package churning than heretofore has been possible.

Another object of the invention is to provide improved combination of means in can and food handling apparatus for sterilizing and waterproofing a can simultaneously at a temperature above 105° C. in an immersed condition in a molten bath liquid; simultaneously displacing the bath liquid with a presterilized atmosphere;

maintaining the empty cans so treated inside and outside in a sterile condition while preparing to charge, charging or filling, closing and sealing; and leak-proofing or coating so as to provide an easily-openable dispensing device which is rupture-proof against accidental displacement during shipment or handling.

Another object of the invention is to provide an improved means in apparatus for packaging a churnable liquiform material in a presterilized can and sealing the closure while the closure is almost, if not entirely, flush against the liquid content level, whereby to keep the food indefinitely with less fat separation due to package churning than has heretofore been possible, and coating the can whereby to provide an easily-openable dispensing device sealed against leakage with a weak leak-proofing material.

Another object of the invention is to provide a novel and improved commercially satisfactory package of sterilized milk having a rupture-proof seal, low thermal conductivity, low weight, a sealed easily-openable dispensing device, and assembled so as to preserve the milk contained therein indefinitely with less fat separation due to package churning than heretofore has been practical.

Another object of the invention is to provide a novel and improved commercially satisfactory package of sterilized milk having low metal weight, low thermal conductivity, a rupture-proof seal, a sealed easily-openable dispensing device, and assembled so as to keep the milk indefinitely.

Another object of the invention is to provide a novel and improved package of sterilized milk having low thermal conductivity, a large filling opening, a rupture-proof seal, a sealed easily-openable dispensing device, and assembled so as to keep the milk indefinitely.

Further objects of the invention will hereinafter appear and for a better understanding of the invention reference may be had to the accompanying drawings showing certain embodiments thereof wherein Fig. 1 is a drawing schematically illustrating the invention as applied to the packaging of food products, such as milk;

Figs. 2 and 3 illustrate a suitable container;

Figs. 4 to 7 are views illustrating the closing and sealing means.

Fig. 8 is a detailed view of a sprocket chain construction utilized;

Fig. 9 is a view similar to Fig. 1 schematically illustrating the application of the invention to the packaging of other food products;

Figs. 10 and 11 are views of a container in which the food products are continuously conveyed to the loading point of Fig. 9; and Figs. 12 to 16 are views illustrating a further modification of the invention.

Referring to the modification of the invention illustrated in Figs. 1 to 8, I have illustrated in Figs. 2 and 3 a fibre container which is particularly adapted to the packaging of churnable food products, such as sterilized milk, since it may be filled and sealed with no gaseous interior portion, namely, it may be filled to practically its entire capacity. Sterilized milk when thus packaged is less subject to fat separation due to package churning or shaking of the package during long periods of handling or transportation. This type of can, although never used prior to the present invention for sterilized milk, has been used successfully in commercial practice for the packaging and transportation of pasteurized milk.

Due to its low cost of manufacture and light weight, a fibre can is preferable to all other types, but due to the packaging and sterilizing problems encountered, its use for sterilized foods has not been successfully employed commercially for liquiform foods.

These containers may be of any suitable shape and form but in the particular embodiment shown are conical in shape with the widest part at the bottom and having a circular base support 2. The top of the container is provided with a sleeve insert 3 which is securely fastened in the open upper end of the container by peening over its upper edge 4 about the periphery of the open end of the container. The sleeve 3 is provided with a flange 5 on its inner edge against which is supported a cup-shaped closure 6 with the latter forming a tight seal with the flange 5 and the wall of sleeve 3. The bottom of this closure 6 is preferably formed of a double layer to reinforce the same and this cup-shaped closure is provided with an upper rim 7 from which an ear 8 projects outwardly, which enables one readily to remove the closure, the latter being sealed to the top by the comparatively weak seal of paraffin.

An important feature of the invention is the automatic and continuous filling of the containers with the liquid food product by novel method and means characterized by the maintenance of sterile conditions at all times including the times during sterilization of the empty containers and during the passage of the sterilized containers to the filling and sealing means, followed by the exposure of the sealed cans to unsterilized atmospheric conditions only after these operations were complete. An apparatus carrying out the invention is generally and diagrammatically illustrated in Fig. 1. It comprises an enclosing housing having a bottom wall 10, side walls 11, and a top wall 12. A sterilizing bath A for the empty containers is disposed in the lower chamber or part of the housing and the side walls 11 are formed with an extension 11' on the righthand side to form an extension of the chamber containing the sterilizing bath A. The righthand side wall 11 is provided with a wing 12' which extends to the left and is inclined downwardly so as to be immersed at its free end 13 in the bath A. This extension wall 12' is sealed to all four of the side walls 11, so as to seal the chamber B above the extension 12' from the chamber C to the right and below the extension, that is, in cooperation with the bath A, the two chambers B and C are thus sealed from each other. A partition and heat insulating wall 15 of the housing is provided and above this wall 15 is disposed the filling and sealing chamber D. There is diagrammatically shown in this chamber a container 16 for the liquid food product to be introduced into the containers 1 and the milk or other liquid food product is supplied to the container 16 through a pipe 17 having a controlling valve 18 therein. The chamber D also contains a container 20 for a sterilized water washing bath through which the filled and sealed containers pass after the filling and sealing operations. The sterilized water is admitted through a pipe 21 controlled by a valve 22. Water may be removed from a tank or container 20 through a pipe 22' controlled by a valve 23 and a trap 24 is provided in this pipe. The atmosphere in the chambers B and D is maintained sterile, as for example by means of sterilized air, and the containers 1 pass successively through the sterilizing bath A, the chamber B and the container 16, and then pass the sealing means, for first sterilizing the empty containers, then filling the empty containers with the food product in the container 16 and then sealing the filled containers at the sealing point E.

Preferably the sterilizing bath A is composed of a waterproofing material, as for example paraffin maintained at a suitable temperature, as for example a temperature of 145° C., so that in the passage of the containers 1 through the bath A they are both sterilized and waterproofed.

The conveying means for conveying the containers through the several chambers in succession will be described in more detail below. Generally it conveys the empty containers into the waterproofing and sterilizing bath A in a manner to fill the containers with the waterproofing and sterilizing liquid, and upon the exit of these containers from the bath A the sterilizing and waterproofing liquid is emptied from the containers and the emptied containers are immediately filled with the pre-sterilized atmosphere in the chamber B which displaces the sterilizing liquid. The waterproofed and sterilized containers are then dipped into the liquid food product contained in the tank 16 to replace the sterilized atmosphere in the containers with the sterilized food product, and thereupon the filled containers have the closures applied upon emergence from the body of the food product and sealed at the point E.

In the particular embodiment shown, the containers 1 are continuously carried through the several chambers of the apparatus by means of a continuous conveyor 30. The latter, starting at a loading station K where the containers 1 are placed on the carrier 30 in inverted position, follows in the dotted path indicated and, passing over a guiding sprocket wheel 31, it is guided down in a substantially vertical path into the sterilizing and waterproofing bath A. Then after reaching a point near the bottom of the bath the continuous conveyor follows in a substantially horizontal path with the containers 1 in an upright position so as to be filled with the sterilizing and waterproofing liquid. The carrier or conveyor upon emerging from the bath on the lefthand side thereof supports the containers in a position to empty the sterilizing liquid. It then follows an upwardly inclined path to the right up through an opening in the wall 15 and then over the end wall of the tank 16, whereupon it follows a generally vertical and downward direction to immerse the containers 1 in the body of the liquid food product in the container. It then follows an upwardly inclined direction to the left out of the body of the food product, the empty containers 1 being supported in a substantially upright position so as to automatically be filled with the liquid food product. Upon emerging from the body of the liquid food product at F, the closures 6 are positioned on the containers and upon passing through the sealing means at E are sealed to the containers. The filled and sealed containers are then carried by the conveyor 30 through the sterilized water contained in the tank 20, the conveyor being suitably guided therethrough in the general path indicated, and then the conveyor, following a continuous course to the right of the chamber D, follows a generally downward vertical course down into the chamber B. Then downwardly to the left and assuming an inclined course, the conveyor reenters the bath A beyond the edge of the wing 12 and passing thereunder it follows a generally horizontal course to the righthand end of the bath, whereupon it emerges from the bath, passes through the chamber C and into the outside atmosphere, and thence to the station L where the filled containers are removed.

Any suitable continuous conveyor for continuously carrying the empty containers through the several chambers and baths may be utilized. In the particular embodiment shown I have illustrated this carrier as formed of a pair of parallel sprocket chains 30 which support between them the can or container holders 32, these holders being of any conventional character. These holders may be in fact supported and guided by a lower stationary track 33 and an upper stationary track 34. As above described the containers 1 are positioned in these holders 32 at the station K and after passing through the various chambers and baths are removed at the station L in Fig. 1.

The closing and sealing of the containers after they emerge from the body of the liquid food in the container 16 is effected by the following described means. Each holder 32 is provided with an arm 37 which is pivoted at 37' to the holder and this arm is normally maintained in a substantially vertical position, as indicated in Fig. 4 in dot and dash lines, except at the sealing station E where it is brought down to the horizontal position shown in Fig. 4. Each arm carries a closure holding device 38 which may be of the conventional spring plug holding type, that is a cup-shaped holder 6 is positioned over this spring plug holding device 38 by an operator, as for example the same operator who positions an empty container on the holder 32, or this may be done automatically if desired.

The position of the arm 37 is controlled by a cam track 40, which in the embodiment shown extends throughout the path of the holders 32. This track comprises a pair of parallel rails (Fig. 4) between which are guided the free ends of the arms 37 and it holds the arms 37 in the vertical position until the sealing station is reached. It then brings them to the horizontal position shown in Fig. 4. During this time the containers 1 have been supported at their top and bottom by the upper track 34 and the lower track 33. In order to permit the closure 6 to fully descend to the closing position the upper track 34 is discontinued, that is to say at the point of the travel (in advance of the station E) where the arm 37 is moved to a point within the vicinity of or approaching the closing or horizontal position the upper track 34 is interrupted for a short distance (Fig. 7) so as to permit the insertion and the sealing of the closure 6 within the upper end of the container. The carrying arm 37 to caused to gradually approach the closing position by the cam track 40 until the closure together with its holder 38 rests upon the container opening. As the holder 32 advances further, the carrying arm 37 rides under a series of upper pressing rollers 41 while a series of lower pressing rollers 42 engages the bottoms of the advancing containers, thereby pressing the closure 6 tightly into sealing and closing relation within the open end of the container 1, the upper rollers 41 engaging the arms 37 while the lower rollers 42 firmly hold the bottoms of the containers 1. The arrangement is such that as the holder 32 advances between the series of rollers 41 and 42, the closure 6 is gradually pressed down into sealing relation with the container, these rollers being provided with a gradually slowly diminishing distance therebetween from the point of entrance between the rollers to the point of exit (Fig. 7), there being sufficient play between the cam track elements 40 to permit this pressing operation of the rollers. The closure 6 is thus caused to form a snug sealing fit with the open end of the container. These rollers 42 are provided with circumferential central clearances 42' to accommodate the lower tracks 33, respectively. At the exit of the holder 32 from between the series of rollers 41 and 42 the track 34 is continued again, a sufficient distance being provided between the last roller 41 and the track 34 to permit the lifting of the arm 37 therebetween by the cam track 40 as shown in dotted lines. The arm 37 is thereby permitted to return to the normal vertical position. Similarly there is sufficient distance between the other end of the gap in the track 34 and the first roller to permit the downward movement of the arm 37, as shown in dot and dash, to a position underneath the rollers 41, it being understood that the illustration Fig. 7 is schematic with certain of the rollers omitted. The closure 6 is now sealed tightly into the upper end of the container and the spring plug holder 38 is readily disengaged by the arm 37 moving up to the vertical position.

The filled and sealed containers are then carried through the tank 20 where they are washed in sterile water in an inverted position. From there, as described above, the filled and sealed containers are brought down through the sterilizing and waterproofing bath A and upon further advancement the containers so sealed by the paraffin are finally carried by the parallel conveyor 30 to the station L where they are removed and empty containers inserted in their place. Thus, the cycle of operation is completed and by the above described process of treatment the churnable contents of the containers will keep indefinitely without undue fat separation due to package churning.

The cam track 40 comprises a pair of stationary parallel guide rails gradually merging from a position to hold the arms 37 in a vertical position in which position they engage the upper end of the arms 37 into a gradually twisting section approaching a position to hold these arms in a horizontal position. Likewise, the exit end of the cam track 40 gradually merges from the horizontal position into a gradually twisting section continuing away from the horizontal until the vertical position has been reached, thereby permitting an easy exit of the arms 37. These sections of the cam track are shown at 40', Fig. 1.

At station L the finished and sealed packages 1 of the food capable of keeping indefinitely are removed in any desirable manner. In the particular embodiment shown they may be removed in an upright position by disposing the track 34 in a slightly lower position with relation to the container 1 at the station L and at the same point the lower track 33 is completely removed or discontinued for a short distance, thereby causing the container to be pushed downward out of its holder 32 through the gap in the track 33 to fall upon an inclined platform 40. Fig. 5 shows the position of the track 34, in advance of and behind the station L and Fig. 6 shows the lowered or cam section 34' of the track 34 at the station for positively pushing the containers out of the holders.

As the empty holder 32 is further advanced to the station K, the empty holder 32 is free to have inserted therein an open container 1 in an inverted position whereby the smallest diameter of the container, namely the open end, fits into the now lower and smallest opening of the holder 32 with a snug but loose fit (this opening being large enough and of a shape to accommodate the closure rim 7 and ear 8), and the largest diameter, namely the bottom of the container, fits into the larger opening in the now upper portion of the holder 32, also with a snug but loose fit. Simultaneously the closures 6 are placed on the holders 38. Thus the container is carried along in a predetermined path of travel between and sliding along the upper and lower tracks 34 and 33. The parallel conveyors 30 are located in a horizontal line about midway crosswise of the containers 1 so as to provide an equal pulling force upon the upper and lower extremities of the containers during the compression sealing operation at E upon emergence from the tank 16. The parallel conveyors 30 are formed of sprocket chain links 57, having forked side extensions 58 which are pivotally fastened to the converging ends of the upper and lower members of the holder 32. The links 57 are provided with knife edge connections 58' at one end engaging sockets 59 at the other end with a gap 59' between the connections.

Any suitable means or method may be provided for heating the sterilizing and waterproofing bath A. In the particular embodiment shown, I have illustrated diagrammatically a series of gas jets 50 playing upon the bottom wall 10 of the chamber, these jets being capable of heating the bath to a point or points, for example, of slightly below 145° C. from the melting temperature of about 56°. Additional heat may be applied to the bath by electrical heating elements 51 immersed therein. If desired, these electric heating elements 51 may be thermostatically controlled (details omitted for convenience in illustration). I have also indicated diagrammatically in Fig. 1 a means for assisting in sterilizing the chambers B and D, this means comprising electric heating elements 52. These elements 52 may also be thermostatically controlled (details omitted for convenience in illustration).

Any suitable means may be provided for furnishing a sterilized atmosphere for the chambers B and D. In the particular embodiment shown, I have indicated the introduction of atmospheric air through a pipe 53 after being sterilized by gas jets 54, the air entering the pipe 53 being forced to pass through the flames of the gas jets 54, the pipe 53 having individual air intakes 53' leading down to the gas jet flames. Preferably the whole interior of the chambers B and D are sterilized before the liquid food product is introduced into the tank 16. As indicated above, this may be effected in any suitable manner and also the sterilized atmospheres in the chambers B and D may be maintained in any suitable manner but satisfactory results may be obtained by utilizing the gas jets 54 which heat all parts of the entrances to the pipe 53 and the atmospheric air as it passes into the same, it being understood that the pipe 53 is closed at its outer end. The holders 32 and the arm 37 may be made of any suitable material, as for example of a phenol-formaldehyde resinous compound containing an asbestos filler capable of absorbing only small quantities of heat, namely having a low specific heat property and assembled with as small a quantity of metal assembling units as possible in order to operate the handling apparatus with thermal efficiency and low heat loss.

The paraffin for the bath A may be introduced into the apparatus through the passageway disposed between the conveyors 30 where they enter and leave the casing, this passage being formed in the horizontal extension wall 11' of the casing. The side walls 11 and 11' and the top wall 12 of the casing are preferably made of insulating material so as to tend to maintain the temperature at an even value in the chambers B and D. The lower wall 10 should be of a metallic material to effect the rapid transmission of heat from the burners 50 into the bath A. The separating wall 15 is of insulating material for separating the chambers B and D so as to insulate the chamber D against the greater heat which may be present in the chamber B. It is understood, as pointed out above, that the apparatus is diagrammatically illustrated and for convenience in illustration the chamber D is above the chamber B. But in order to minimize the transfer of heat from the chamber B to the chamber D, the latter should not be at a greater elevation than the chamber B and preferably should be at a lower elevation so as to avoid the transfer of heat from the chamber B to the chamber D by the flow of heated currents, that is, in actual practice it may be preferable to have the chamber B above the level of the chamber D for the reasons indicated.

When the food product in the chamber 16 is one from which it is desirable to exclude oxygen during the packaging operations, such for example as orange juice, the exclusion of such oxygen may be effected in any suitable manner. In Fig. 1 I have illustrated a carbon dioxide tank 60 having pipes 61 of any suitable material leading through the upper extension wall 11' through the chamber C and down to a point near the bottom of the bath A and from there are extended by pipe sections 62 (only one pipe being shown for convenience in illustration). The pipe sections 62 are inclined upwardly as they extend to the left and merge into exit portions 62' leading into the bath beyond the edge 13 of the wall 12'. The carbon dioxide is heated by the paraffin bath both while in the elongated pipes and in the bath. From the bath the carbon dioxide thus sterilized by the bath enters the chamber B and fills the lower part thereof thereby causing the oxygen, air, or other lighter gas to rise and flow out of that part of the interior of the handling apparatus where the filling, closing and sealing operations are performed. The rate of flow of carbon dioxide is preferably extremely slow so as not to seriously affect the flames 54 should any carbon dioxide be allowed to flow therethrough by complete displacement of all other gases.

Any suitable drive for the continuous conveyor 30 may be provided. In the particular embodiment illustrated, the holders 32 are illustrated as adapted to carry only one container which is treated and packaged and conducted in a single processional order but it is understood that a multiple number of processional orders may be provided in each holder 32, namely instead of one can or container as shown in the drawings a multiple number could be accommodated, each container having its separate closure holder arm 37 and closure holder arm 38 whereby to greatly increase the output of a single machine and requiring only one set of parallel sprocket chain conveyors 30. Thus the present invention embodies a method and apparatus of the character described which is simple and economic and capable of performance in a small area of space for the work it is to perform whereby to obtain in a very small space production upon a large quantity basis in a short period of time and which is relatively inexpensive to install and capable of rapid and efficient operation.

Figs. 5 and 6 show the method and apparatus for holding the smallest diameter of can 1 in the can holder 32. The metal top which joins the fibre top wall by spinning is practically flush with the top surface of can holder 32 to provide a fairly snug-like fit. A clearance 63 in the holder 32 permits, as shown, the can 1 to be pushed out of its holder 32 by the track 8 being so positioned and disposed, as herein shown, when the sealed can reaches station L. In Fig. 6, the dotted line showing the top of the sealed can 1 would, therefore, represent the top of the closure 6. The holder 32 is also provided with another or vertical clearance in upper small hole to allow the ear or flap 8 to be inserted therein during closing.

The sterilized food filling material in tank 16 and the sterilized water in tank 20 may be advantageously prepared by the methods described in either U. S. Letters Patent Re. 19,193 or 2,170,195. According to the method proposed in the first specification either one of two alternatives may be used to sterilize and prepare milk as follows. The milk may be carried through the vacuum pan and the filling machine both sterile and free of air. The milk may be maintained free of bacteria but in partial contact with sterile air. Briefly, according to both modifications of this method, milk is admitted into a suitably lined forewarmer of an entirely sterile apparatus, then heated rapidly and sterilized in this forewarmer by steam through a large number of steam jets at the bottom, having a velocity of about 1,400 feet per second until the temperature of the milk rises to about 240° F., the steam being allowed to escape at the top through a vent. The milk is then transferred to a vacuum pan and concentrated. The milk is then admitted into a discharge tank, either in the presence of sterile air or nitrogen. The milk is then admitted to a homogenizer, further treated, and finally stored in a suitably lined air-tight storage tank. As soon as possible after sterilizing, it may be noted the milk is cooled as rapidly as possible, whereby the heat treatment of the milk is of the shortest possible duration to sterilize.

This milk so sterilized may be admitted into the filling tank 16 of the present invention.

Water, after being sterilized in the forewarmer of the apparatus described in Re. 19,193, may be admitted to the washing tank 20 directly after sterilization in the forewarmer.

In U. S. Letters Patent No. 2,170,195 a sterilizing apparatus to permit a continuous flow of milk devoid of air is described. This apparatus is useful for continuous packaging such as in the present invention. After milk completely sterilized has been admitted to the final receiving chamber, as illustrated in the specification of U. S. Patent No. 2,170,195, the sterilized milk may be admitted to the filling tank 16 in a manner which is continuous and approximately at the same rate at which the filling material is taken away in the apparatus of the present invention.

Any vacuum or low pressure apparatus used in conjunction with the present invention should be provided with bacteria-proof stop valves, such as 18, 22 and 23, and where rotating shafts extend through the walls of such apparatus, also bacteria-proof packing. This may be accomplished by surrounding the valve stem or rotating shaft in a suitable opening of an oilless metal bearing or stationary support with a relatively thin layer of suitable packing to prevent the outward flow of steam or liquid as the case may be. Outwardly adjacent this layer of packing in the same surrounding opening, another thicker layer of bacteria-proof packing material may be added, made of finely pulverized carbon or graphite. The two layers of packing are held in position under such pressure as to function and also prevent the passage of bacteria through the outer packing or the steam or liquid through the inner packing, as the case may be, by any suitable mechanical means such as, for example, between a gland and a bushing and so adjusted as to apply sufficient compression to the packing materials at any time desired.

The product of the present invention may be definitely distinguished from ordinary packages of sterile liquiform products capable of preservation indefinitely by the containers being made almost entirely of fibre instead of metal or other material, thereby having the advantages of fibre without the disadvantages of metal or other materials, yet having a strong, reinforcing support protecting the seal and forming a very strong support upon which other cans may be stacked; having low thermal conductivity whereby a refrigerated package of sterile liquiform food will keep cool longer than ordinary packages made of metal or other materials; having a sealed, easily-openable dispensing device more easily opened than with ordinary packages of sterile liquiform food; having a very large filling-opening, whereby economical packages of sterilized milk may be made, since large openings can be filled much more rapidly and with greater ease in automatic machinery upon a quantity basis of production than ordinary metal cans of sterilized milk having small vent holes suitable for sealing by soldering; and being assembled so as to keep sterilized milk indefinitely and with less fat separation, when the package is subject to long periods of package churning, than ordinary packages of sterilized milk. The sealed package differs also from ordinary packages of sterile liquiform products by being lighter in weight and formed of materials whereby the can and closure may be more economically manufactured and fabricated than heretofore has been possible. Again, by utilization of small quantities of aluminum for the formation of a dispensing opening, the can of food upon opening may be used in part and the unused portion stored in the refrigerator without fear of food poisoning or contamination due to chemical metal reaction.

Packaging of solid food

In an alternate method, where it is desired to package solid foods in paper or fiber cans, etc., a method and apparatus as shown in Figs. 9 to 11 may be used. Solid food, preferably in the form of cubes or lumps of variously desired shapes of small size, or foods having their natural size when small enough, may be placed in a wire screen carrier 72 in an amount equivalent to the capacity of the fiber can 1. The carrier 72 is fastened at its outside middle circumferential portion to a holder 74 (which may be made of phenol-formaldehyde molded resinous material). The holder 74 is attached on opposite sides to a pair of extensions 80' of certain links in parallel sprocket chain conveyors 80 and is carried along in a predetermined path of travel by that conveyor.

This path starting from a loading station M leads downwardly through a sterilizing bath 81 contained in a container 88. Then out of this bath and through the wall 11 of the casing to the can filling station N. Then upwardly and out through the casing 11 again and downwardly returning through the bath 81 over a guide 93 and back to the loading station M. Other suitable guides may be provided.

The basket 72 is provided with an openable lid 70 at the top and a similar openable lid 71 at the bottom. These lids are carried by spring arms 75 and 76 which are fastened to the holder 74 in any suitable manner, as by riveting. The closures 70 and 71 are normally held in closing position by means of the spring arms 75 and 76 but may be moved out of closing position by stationary cams engaging arms 85 carried by the spring arm 75 and arms 86 carried by the spring arm 76. There are, for example, a pair of cams 78 for engaging the arms 85 when it is desired to open the closure 70 and to fill the basket. Similarly, there are a pair of stationary cams 77 for engaging the arms 86 extending out from the arms 76 to open the bottom closure 71 at the dumping or filling station N. Thus, after the baskets 72 are carried past the station M and are filled with the solid food product and as they pass the filling station N, these baskets are emptied to fill the containers 1 which are continuously conveyed therepast by means of the continuous conveyor 30 similarly to the conveyor set forth in Fig. 1. The spring arms 75 and 76 are actuated by the cams 78 and 77 and caused to bend in the vicinity of the points marked 95 and 96 to remove the closure 70 and 71 at the loading and filling stations.

The bath 81 is preferably of an edible oil or fat, such as olive oil, peanut oil, hydrogenated oil, oleomargarine, lard, butter, or such like, which may be heated by gas jets 87 playing against the bottom of the container 88 and adapted to heat the bath say to about 145° C. Additional heating elements, as for example of the electric type, 82 may be immersed in the bath 81 for regulating the temperature of the bath 81 and thermostatically controlled devices (omitted for convenience in illustration) may be utilized for controlling this temperature, say at a constant temperature of 145° C. The screen carriers 72 upon being advanced through the bath 81 are surrounded and sterilized at say around 145° C. and the speed or passage through the bath may be regulated to suit different conditions. The top wall 12 of the casing is extended to the right beyond the side wall 11 and is joined by a wall 12' which extends vertically downwardly into the bath 81 and then for a short distance horizontally. By this means the chamber D' formed between the side wall 11 and the wall 12' is sealed so as to be subjected to the same atmospheric conditions existing in the chamber D, preferably sterilized conditions as described in connection with Fig. 1. Any outside bacteria is killed by the passage of the baskets with the solid food therein through the bath 81 before such bacteria can pass through the bath and enter the interior of the handling apparatus. The particles of the bath 81 collected by the baskets upon passing through the bath 81 drip off before the baskets pass through the wall and upon passing the station N, as above described, the baskets 72 are emptied and their contents dumped into the containers 1, it being understood that the conveyor 30 operates at the same rate of speed as the conveyor 80 and in unison therewith. It is desired to add liquid to the food contents in the cans 1, as for example in the form of sterilized water or other suitable liquid, and such liquid is passed through the pipe 83 from a suitable sterilizer from whence it is allowed to pour continuously into the containers 1 through an opening in lower section of pipe 84 leading downwardly from pipe 83, the containers 1 at this point being in an open condition and passing below the outlet 84. The carrier 72 after having its food dumped into can 1 returns through the bath 81 and finally returns to its starting point approaching parallel cams 78 thus completing the cycle. Liquid 90 which drops into the tank 91 from the drip pipe 84, failing to enter the containers 1, is carried out of the tank 91 through pipe 92 and returned by any suitable means to the sterilizer or directly to the pipe 83. The solid food may be in the form of peas, cut string beans, diced carrots, diced or small potatoes, diced beets, meat cubes, whole grain corn, cauliflower cubes, oysters, mushrooms, rice, sweet potato cubes, chopped celery, red or kidney beans, baked beans, lima beans, turnips, spaghetti, or various other types of food having a sufficient degree of mobility as to be passed easily by gravity through an opening the size of the opening in can 1.

The sprocket chain conveyors 80 including the conveyors which conduct the cans 1 may be advanced in any predetermined desired path of travel over sprocket wheels in metal oilless bearings.

The sterilizing bath 81 including the can sterilizing bath is preferably maintained at ordinary atmospheric pressure.

The entire handling apparatus including auxiliary equipment may be housed in a small area of space thus enabling the area to be protectively housed relatively inexpensively for the work it is to perform in a completely bomb-proof air raid shelter.

For sterilizing the apparatus before water is admitted to chambers 20 and 91, I have indicated at 52' electrical heaters (preferably thermostatically controlled) which are operated for the desired length of time with all valves closed, ordinarily the temperature being maintained at around that of the bath A.

Throughout this specification where I have used the word "sterilized" I mean ordinary commercial sterilization whereby the food after being packaged and sealed according to my invention may be preserved indefinitely or for the time passing between the packaging operation and the consumption by the public. By the use of the method and apparatus, however, of my invention, the sterilization of the food products is assured and rendered more uniform.

The carriers 72 are caused to advance at the same velocity of the cans 1 by suitable transmission drive chain from reduction gear sprocket wheel driven by a motor to the sprocket wheel 93 which is connected by a drive shaft to a sprocket wheel for continuously operating parallel sprocket chain conveyors 80 in which certain links have extensions 80'.

During sterilization of the apparatus just described, the tank 91 is preferably empty and the tank 88 contains sufficient oil or fat heated to about 145° C. to seal the entrance and maintain a sterilizing medium capable of sterilizing any bacteria entering the bath 81. During sterilization of the apparatus the stop valves 83' and 92' in pipe 83 and pipe 92 are closed.

Figs. 12 to 16 illustrate a modification of the invention for the handling and packaging of liquid food products. In this modification a continuous conveyor 30 of the general character shown in Figs. 1 and 9 is provided for continuously conveying the holders 32 with the containers therein past filling stations O and P and each of the containers 1 is partially filled with the food product such as sterilized milk at station O, and completely filled at the filling station P. In this modification instead of dipping the containers 1 in the body of liquid food product to fill the same they are filled by measured charges of the food product delivered to the open containers at the stations O and P. The measured charges are supplied by any suitable pump mechanism indicated generally by the letter Z, it being understood that the pump or pumps of the mechanism Z supply measured charges periodically and in timed relation with the movement of the conveyor 30 to the outlets 105. The outlets 105 lead to a stationary hollow shaft 107, the latter being closed by a plug 107', that is each of the outlet pipes 105 lead to a separate hollow shaft 107. There rotates about this hollow shaft 107 a hub 111 having hollow spokes 113 with openings 114 in the ends of these spokes which are lined up with and operate in unison with the holders 32 and the containers 1 as the latter are brought to points underneath the ends of the spokes. Each shaft 107 has a slot 109 in the wall for successively establishing communication between a hollow spoke and the chamber within the hollow hub 107 as the hub 111 is rotated, that is there is an opening or port 112 in the hub 111 for each of the hollow spokes, registering with the inner end of each spoke 113, which establishes communication with the port 109 during a portion of each revolution of the hub 111. In the particular embodiment shown such communication is established during one-eighth of the revolution or 45 degree travel of the hub, that is, the moment a spoke 113 becomes aligned with the container 1 as it begins to pass the guiding sprocket 116, or at a predetermined time thereafter, the communication through the ports 109 and 112 is begun to be established and this communication is disestablished when the spoke reaches the vertical downward position. It is during this movement of a spoke 113 in alignment with an open container 1 that a measured charge of a liquid food such as milk is delivered by the pump or pumps Z to the interior of the hub 107 through the pipe 105.

For convenience in illustration, the casings and chambers of Fig. 1 are omitted, but it is understood that the conveyor 30 continuously carries the containers 1 successively through a sterilizing and waterproofing bath such as bath A of Fig. 1 and sterilizing chambers B and D. In like manner the unit or units Z may be entirely enclosed in the chamber D so as to assure the maintenance of the sterilized condition of the liquid food product during the filling and sealing operations. It is also understood that the closing and sealing operations are carried on similarly to the operations described in connection with Fig. 1.

Fig. 14 illustrates generally the means whereby the pump unit Z is driven in unison with the continuous conveyor 30. This drive consists of a sprocket wheel 100 mounted on a shaft 101 which is geared to the driving shaft 104 of the pump through the gear elements 102 and 103. Fig. 13 illustrates a means for driving the hubs 111 in unison with the movements of the continuous conveyor 30. This means comprises a pair of sprocket wheels 115 for each of the hubs 111, engaging the continuous conveyor 30 and driven thereby. A sprocket chain 119 connects the hubs 111 for operation in unison by means of the sprockets indicated and this sprocket chain drive 119 in turn meshes with a sprocket wheel on a shaft 120, the latter being driven from the sprocket drive meshing with the conveyor 30. Each hub 111 is geared through a sprocket 117 with a sprocket 118 on the shaft 120.

The spokes 113 may be continuously open at their exits 114 or may have a spring closed poppet valve 125 therein (Fig. 16). The stem 126 of this valve is carried by a sleeve 127 slidably mounted in the hollow hub 113 and a spring 128 engaging at one end a shoulder 129 formed in the interior of the spoke 113 and engaging at its other end the sleeve 127. With this arrangement the valve 125 is automatically opened by the pressure of the liquid measured charge forced into the spoke as the latter is in alignment with a container 1. A more rapid operation of the apparatus is rendered possible by this arrangement. The pump mechanism for supplying the measured charges of the liquid food product indicated generally by the numeral Z may be generally of the character of the measured charge forming mechanism of Patent No. 2,070,841 and, of course, instead of that mechanism there shown, any suitable charge forming mechanism Z operating in timed relation with the rotation of the hubs 111 and the continuous conveyor 30 may be employed. Preferably as indicated in Fig. 16 the outlet of the spoke 113 is very close to or preferably slightly within the container 1 during the one-eighth revolution the spokes are aligned with the containers.

While certain advantages may be obtained from practicing my invention at lower temperatures than those stated in the specification, yet for best results the temperature of the sterilizing and waterproofing bath should be maintained above the minimum indicated in this specification. Where high temperatures are used, it is important that the fibre containers be of a character to withstand the high temperatures encountered under my preferred treatment. For example, the dried adhesive used in the assembly of the fibre container should be such as to withstand a temperature of 145° C., for say 30 seconds or longer. I have found a satisfactory adhesive paste for this purpose to be one which is prepared as follows. Mix cold by weight 100 parts dextrine (65 to 70% soluble in water type), 12 parts borax and 1.2 sodium carbonate. A suitable time before the day on which the paste is to be used, as for example upon the evening before, there should be added to the cold mixture water in proportion of 1.5 times the weight of the dry mixed materials and the mixture then thoroughly stirred or mixed. If desired, more water may be added just before using where it is desired to have a more fluid paste. Other suitable formulae capable of sealing the cartons may be used.

When the carbon dioxide is utilized from the tank 60, it is preferred that the pipe 53 for the introduction of the sterilized air into the chamber D be at the highest practicable elevation. In Fig. 1 the drawing is schematic and for convenience in illustration the pipe 53 is shown entering the chamber D at a point slightly removed from the top thereof.

In the practice of either of the embodiments of the invention above set forth and described there is no impairment of the seal of the filled containers upon their repassage through the hot paraffin bath on their way out of the filling and sealing chamber. All liquid foods such as milk, fruit juices and the like are capable of absorbing heat at a very high rate, and accordingly upon passage through the hot paraffin bath the heat is absorbed so fast that the paraffin coating on the interior of the containers is not remelted. The tendency also is to prevent the remelting of the paraffin coating on the exteriors of the fillers, but any small degree of remelting would not impair the seal and, moreover, it would be chilled again immediately the filled containers are brought out of the bath into the open air.

In cases where the food product itself does not have a cooling or heat absorbing liquid such for example as solid foods, fruits and the like, it is essential to add a liquid such as sterilized water having a high specific heat, as for example as illustrated in Fig. 9. The added liquid functions, among other things, to keep the interior of the containers cool while repassing through the paraffin or sterilizing bath.

The sterilization of the carbon dioxide instead of being effected in the hot paraffin bath A may be effected in any suitable manner as, for example, by sterilizing the gas before it is stored in the container 60, or by sterilizing it on its way through the control valve into pipe 61 in any suitable manner.

I claim:

1. The method of packaging food products which comprises the steps of sterilizing and waterproofing empty containers to be filled by passing them through a sterilizing and waterproofing heated liquid bath and completely removing the air from the containers while passing through the bath by completely filling the same with the liquid bath, passing the same from said bath directly into a sterilized atmosphere to be filled without exposure to contaminating air, filling said empty containers with the food product in a sterile atmosphere, applying closures to the filled containers and sealing the same while still in a sterilized atmosphere, then passing the filled and sealed containers through a sterilized washing bath, and then repassing the filled and sealed containers through a sterilizing and waterproofing bath on the way out of the sterilized chamber.

2. In an automatic packaging apparatus for sterilizing and waterproofing empty containers and the packaging of food products under sterile conditions throughout, means for sealing the entrance of a housing having a sterile interior chamber by means of a heated liquid sterilizing and waterproofing bath, means for heating the bath to a temperature above 105° C., means for advancing the containers through said bath and while passing therethrough supporting the containers in a completely fillable position so as to fill the containers with the heated liquid bath to remove all air and emptying the same upon removal to the sterile chamber, means for filling the containers with a food product while still in the sterile chamber and means for closing and sealing the filled containers while in said sterile chamber.

3. The method of packing food products which comprises the steps of sterilizing and waterproofing empty fibrous containers by wholly immersing them in and passing them through a bath of a sterilizing and waterproofing material and while passing the containers through the bath of sterilizing and waterproofing material filling them with the sterilizing and waterproofing material to expel all contained air and to thoroughly waterproof and sterilize all parts of the surfaces thereof, then emptying the same and passing them from the bath directly into a sterilized atmosphere without subjection of the sterilized containers to contaminated air, conveying them while still subjected to a sterile atmosphere to filling and sealing stations, filling the containers with the food product while in a sterile medium, and closing the filled containers and sealing the same while still in a sterile medium.

4. The method of packaging food products which comprises the steps of immersing an empty container in a sterilizing and waterproofing heated liquid bath and while in the latter completely removing the air from the container by supporting it open end up while wholly immersed in the bath, displacing the bath liquid in the container with a sterile atmosphere, passing the container to stations for filling and closing without exposure to an unsterilized atmosphere, filling and closing the container in a sterile medium, sealing the container by mechanical means while still in a sterile medium, and then leak-proofing the filled container by conducting the container through a sterilizing waterproofing liquid out of exposure to an unsterile atmosphere.

5. In an apparatus of the character set forth a compartment in the interior of which is maintained a sterile atmosphere, means in said compartment for filling fibrous containers with a food product and sealing the containers, a water proofing liquid sealing bath for said compartment and means conveying the empty fibrous containers from the outside to the inside of said compartment through said bath for sterilizing and water proofing the containers both inside and outside and while conveying the empty containers through said bath supporting them in a completely fillable position to completely fill the containers with the liquid bath and to remove the contained gases, then removing the bath filled containers from the bath and upon exit therefrom emptying the same and then without subjecting the containers to a contaminating atmosphere positioning them directly to the filling and sealing means in the sterile compartment.

6. In an apparatus of the character set forth a compartment in the interior of which is maintained a sterile atmosphere, means in said compartment for filling fibrous containers with a food product and sealing the containers, a water proofing liquid sealing bath for said compartment and means conveying the empty fibrous containers from the outside to the inside of said compartment through said bath for sterilizing and water proofing the containers both inside and outside and supporting and conveying the empty containers through the bath in a manner to completely fill the same with the bath and thereby to expel any contained air and then without subjecting the containers to a contaminating atmosphere positioning them directly to the filling and sealing means in the sterile compartment and means for then passing the filled and sealed containers back through said water proofing and sterilizing bath to the outside of the compartment.

7. In apparatus for sterilizing and water proofing empty containers and the packaging of food products under sterile conditions throughout, the combination of a housing having a sterile interior chamber, an entrance to said chamber sealed against the entrance of the outside atmosphere by a heated liquid sterilizing and waterproofing bath, means for passing empty fibrous containers from the outside into and through said bath and while passing the same therethrough supporting the empty containers at least during a portion of the passage with their open ends elevated above their closed ends for expelling all contained air by completely filling the containers with the liquid bath and then emptying the liquid bath from the containers upon entry into the chamber and means in said sterile chamber for filling the sterile containers with a food product and for closing and sealing the charged containers all in said sterile atmosphere.

8. In an apparatus for sterilizing and waterproofing empty containers and the packaging of food products under sterile conditions throughout, a tank containing a heated liquid sterilizing and waterproofing bath of a depth greater than the height of the containers, a filling station for filling the containers with food products under sterile conditions, a sealing station for closing and sealing the filled containers under sterile conditions, an empty container loading station exposed to the atmosphere, a single continuous conveyor passing from said air exposed station for the reception of empty containers thereat, then conveying the empty containers through the sterilizing and waterproofing bath with the empty containers wholly immersed and during at least a part of the passage through the bath supported with their open ends up to completely fill them with liquid of the bath and to expel all contained air and thoroughly to sterilize and waterproof all parts of the containers, said conveyor upon exit from the bath emptying and draining the heated liquid bath from the treated containers and a sterile chamber extending all the way between the exit of the bath and the filling station through which the conveyor passes.

SYLVESTER CLYDE LEHMAN.